US008701110B2

(12) United States Patent
Friedman et al.

(10) Patent No.: US 8,701,110 B2
(45) Date of Patent: *Apr. 15, 2014

(54) EFFICIENT VOLUME MANAGER HOT SWAPPING (71) Applicant: Oracle International Corporation, Redwood Shores, CA (US)

(72) Inventors: David Friedman, San Francisco, CA (US); Prasad Bagal, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/709,024

(22) Filed: Dec. 9, 2012

(65) Prior Publication Data
US 2013/0097374 A1 Apr. 18, 2013

Related U.S. Application Data

(63) Continuation of application No. 12/274,203, filed on Nov. 19, 2008, now Pat. No. 8,392,915.

(51) Int. Cl.
*G06F 9/455* (2006.01)
(52) U.S. Cl.
USPC .................................. 718/1; 707/640
(58) Field of Classification Search
None
See application file for complete search history.

(56) References Cited

U.S. PATENT DOCUMENTS

| 5,873,101 | A * | 2/1999 | Klein ........................... 707/640 |
| 7,353,351 | B1 | 4/2008 | Haase et al. |
| 8,392,915 | B2 | 3/2013 | Friedman et al. |
| 2006/0155735 | A1 | 7/2006 | Traut et al. |
| 2008/0086727 | A1 | 4/2008 | Lam et al. |
| 2008/0104359 | A1 | 5/2008 | Sauer et al. |
| 2008/0134178 | A1 | 6/2008 | Fitzgerald et al. |
| 2008/0163239 | A1 | 7/2008 | Sugumar et al. |
| 2009/0019029 | A1 | 1/2009 | Tommaney et al. |
| 2010/0114825 | A1 | 5/2010 | Siddegowda |

OTHER PUBLICATIONS

Baumann, A., et al. "Module Hot-Swapping for Dynamic Update and Reconfiguration in K42," *Proceedings of* Linux.conf.au, 2005, pp. 1-8.

* cited by examiner

*Primary Examiner* — Emerson Puente
*Assistant Examiner* — Dong Kim
(74) *Attorney, Agent, or Firm* — Kilpatrick Townsend & Stockton LLP (57) ABSTRACT

A method of updating an extent map is described. The method includes providing in a memory an instance of a first version of the extent map, wherein the instance is referenced by an application. The extent map include entries. The method further includes storing, at each extent map entry, an offset from the beginning of a physical drive which is identified within said each extent map entry, providing a second version of the extent map, comparing the first version of the extent map with the second version of the extent map, in response to the comparing, determining that is at least on segment in the second version of the extent map that is different from a corresponding at least one segment in the first version of the extent map.

20 Claims, 11 Drawing Sheets

EFFICIENT VOLUME MANAGER HOT SWAPPING

CROSS-REFERENCES TO RELATED APPLICATIONS

THIS APPLICATION IS A CONTINUATION OF U.S. patent application Ser. No. 12/274,203 ENTITLED EFFICIENT VOLUME MANAGER HOT SWAPPING FILED ON Nov. 19, 2008, WHICH IS INCORPORATED BY REFERENCE IN ITS ENTIRETY FOR ANY AND ALL PURPOSES, AND PRIORITY IS CLAIMED THERETO.

BACKGROUND OF THE INVENTION

A Logical Volume Manager (LVM) is a software implemented manager for disk drives and other mass-storage devices. An LVM allocates space on mass-storage devices so that disk partitions can be combined into larger virtual 'partitions' that can be resized or moved. The resulting logical volumes can include several physical volumes. An LVM often includes a striping or a dithering feature that spreads saved data over different disks for improved access speeds. Mirroring or parity is also used to improve fault tolerance. The combinations and mappings of partitions coupled with striping and/or dithering can result in a complex relationship between logical storage space and physical storage space which is managed by the LVM.

Figure 1:
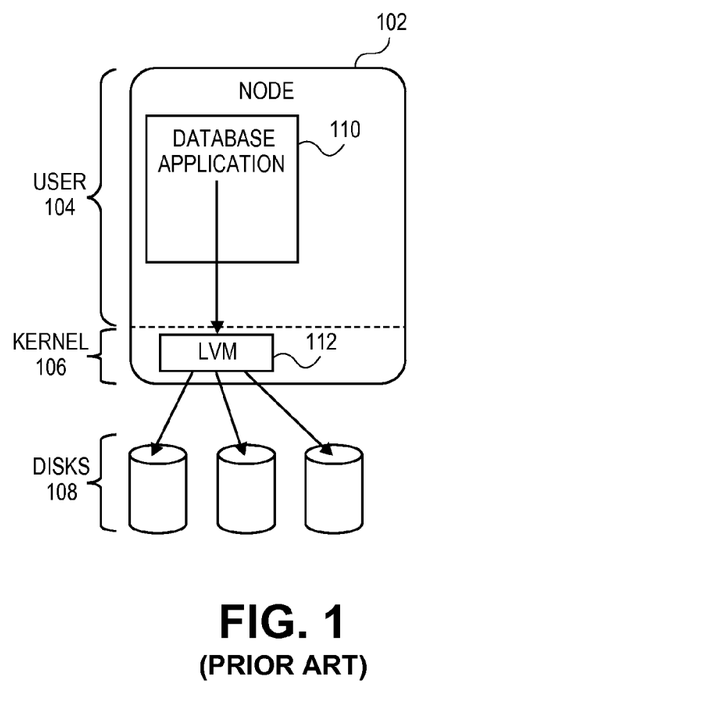
FIG. 1 illustrates a prior art computer node with a kernel-based logical volume manager (LVM).

Commonly, an LVM resides in the kernel of a computer's operating system. The kernel resides in memory allocated for the kernel, as opposed to memory allocated for the user space, as shown in FIG. 1. Such prior art LVMs include those provided in HP-UX and Linux, as well as third-party solutions such as Veritas VxVM. A kernel-based LVM typically receives instructions from a software application to read and write data from/to a logical volume, and the kernel-based LVM takes care of reading/writing from the physical volume.

With reference to FIG. 1, a node 102, which can include a server, workstation, cell phone, or other computing device, may or may not be connected to a network. Node 102 can have memory reserved for kernel 106, sometimes called kernel space, and memory reserved for applications and data, user memory 104. Kernel-based LVM 112 intercepts read/write instructions from database application 110 and manages the proper input/output (I/O) between the application and disks 108. This is sometimes referred to as "in-band" I/O.

The arrows in the figures generally show references or mappings as well as the general direction of commands and messages. The directions of the arrows are not intended to limit communications to one direction. For example, and as is understood in the art, reading and writing can occur in both directions of each arrowed connection in FIG. 1, such as between application 110, LVM 112, and disks 108.

Disks 108 can represent any type of persistent storage, such as storage which is directly attached to a node as a peripheral device (direct-attached storage), storage which is attached to another node on a network and accessible through the network (network-attached storage), or a storage area network. A storage area network commonly refers to a set of specially networked persistent storage devices in which a node on a network addresses disks at the block level. The node, and its LVM, are left to manage the file system of the storage devices. Shared storage is storage which is shared between multiple nodes on a network.

Application 110 can be a small scale application on a single-user device, or it can be a large-scale application which services thousands of users. Large scale applications are common for Web-based storefronts, such as those for well-known online retailers. Large scale applications can include massive database applications which manage terabytes of data. One-hundred terabyte to multi-petabyte databases are not uncommon for modern applications of large companies. To run with the minimal latencies that most online consumers and vendors expect, such databases typically require caching of actively used tables, queries, and other data in a "database buffer cache."

In line with customer and vendor expectations of low latencies is the expectation of high reliability and minimal downtime. Such downtime is often measured in seconds or fractions of a second. At extremely busy retail Web sites, a few seconds of downtime can coincide with several, if not hundreds of database requests. When downtime occurs at the same time as a database request, the request can end up being delayed, denied, or even dropped. Thus, a Database Administrator (DBA) typically strives to avoid unnecessary downtime and schedule necessary downtime sparingly and for periods when the database load is light, for example, at 2:00 AM on a Sunday morning.

Upgrading an LVM often requires downtime. The upgrade may be necessary, because of a newly-found bug or security hole in the LVM which needs to be patched. Alternatively, the upgrade may be elective, in order to improve performance or maintainability of the LVM.

Besides scheduled downtime, there are cases of unscheduled downtime. An LVM can stop or fault on its own due to a variety of reasons, including traffic saturation, hardware failures, or bugs in the LVM code. In such a case, rapid re-initialization or rebooting of the LVM is required to minimize downtime. Whether due to a fault or a scheduled upgrade, stopping the LVM can result in a substantial amount of unwanted downtime.

With kernel-based LVM 112 in FIG. 1, stopping the LVM is often associated with stopping large portions of or the entire kernel of a node. This is because other parts of the kernel may hold references to the kernel-based LVM, and broken references in the kernel may lead to a complete computer crash if the kernel is not deactivated. Thus, it is generally more difficult to hot-swap a kernel-based LVM without inactivating the entire kernel. An architecture and method for enabling hot-swapping of a kernel-based LVM is disclosed in Baumann, et al., "Module Hot-Swapping for Dynamic Update and Reconfiguration in K42," *Proceedings of Linux.conf.au*, Canberra, Australia, April 2005, 8 pages. However, the paper does not address the problems encountered in shared storage access by multiple nodes or of LVMs residing in user memory.

A user-memory-based LVM avoids the situation where parts of the kernel hold critical references to the DIM which would crash the system if broken. Such a user-memory-based LVM includes such software products as Oracle Automatic Storage Management (ASM), which has been implemented in Oracle Database 10g/11g.

A user-memory-based LVM such as ASM commonly uses an "extent map," sometimes called an Xmap. An Xmap is typically created for each file accessed by an application which uses the LVM. The Xmap includes a listing or table of physical drives or partitions, as well as offsets from the beginning of each physical drive or partition, thereby 'mapping' the file to where it is read from or written to persistent storage. An Xmap can have many, if not hundreds or thousands of rows.

Because an application using ASM generally does not direct I/O through the kernel in order to map a file to persistent storage, this type of I/O is sometimes referred to as "out-of-band" I/O.

BRIEF SUMMARY OF THE INVENTION

Embodiments in accordance with the present disclosure relate to methods for hot-swapping a logical volume manager (LVM) and updating its extent map. Generally, the application which uses the LVM is quiesced. Then, the LVM is shut down while version numbers of segments of the extent map are saved, and the new LVM is started. Only those portions of the new extent map which are modified are replaced. The application is then unquiesced so that the application can access persistent storage again.

One embodiment relates to a method of updating an extent map associated with a logical volume manager (LVM), the method including providing in a memory an instance of a first version of an extent map associated with an LVM, the instance referenced by an application, providing a second version of the extent map, determining whether there is a segment in the second version of the extent map which is different from a corresponding segment in the first version of the extent map, and updating the instance in the memory of the first version of the extent map with the segment from the second extent map. During the updating the instance in the memory of the first version of the extent map, the instance of the first version of the extent map remains substantially in the memory such that the entire first version of the extent map need not be replaced by the entire second version of the extent map. Remaining "substantially" in memory includes having a large portion, such as 10%, 15%, 25%, 75%, 90%, 99% or more which stays in memory. In some operating conditions when the first and second versions of the extent map are the same, 100% of the extent map remains in memory without any extra overhead of reading the extent map from the physical disks.

Another embodiment relates to a method of hot-swapping a logical volume manager (LVM) having a first version and a second version, the method including shutting down a first version of an LVM associated with an instance of a first extent map in a memory, the instance referenced by an application, starting a second version of the LVM, the second version of the LVM associated with a second extent map, determining whether there is a difference between the first and second extent maps, and when it is determined that there is a difference between the first and second extent maps, updating the instance of the first extent map with the difference from the second extent map. During the updating, the instance of the first extent map remains substantially in the memory such that the entire first extent map need not be replaced by the entire second extent map.

Yet another embodiment relates to a method of migrating a virtual machine running an application which references a first logical volume manager (DIM) running outside the virtual machine, the application having a first extent map, the method including quiescing the application, copying the application from a virtual machine running on a first physical machine to a virtual machine running on a second physical machine, detecting the absence of an LVM on the second physical machine, in response to the detected absence, starting a second LVM on the second physical machine, the second LVM creating a second extent map, determining whether there is a difference between the first and second extent maps, and when it is determined that there is no difference between the first and second extent maps, un-quiescing the application such that the application continues using the first extent map, the first extent map not being replaced by the second extent map. Using the same extent map eliminates the requirement for updating and allows less downtime when switching virtual machines.

A further understanding of the nature and the advantages of the embodiments disclosed and suggested herein may be realized by reference of the remaining portions of the specification and the attached drawings.

DETAILED DESCRIPTION OF THE INVENTION

Figure 2:
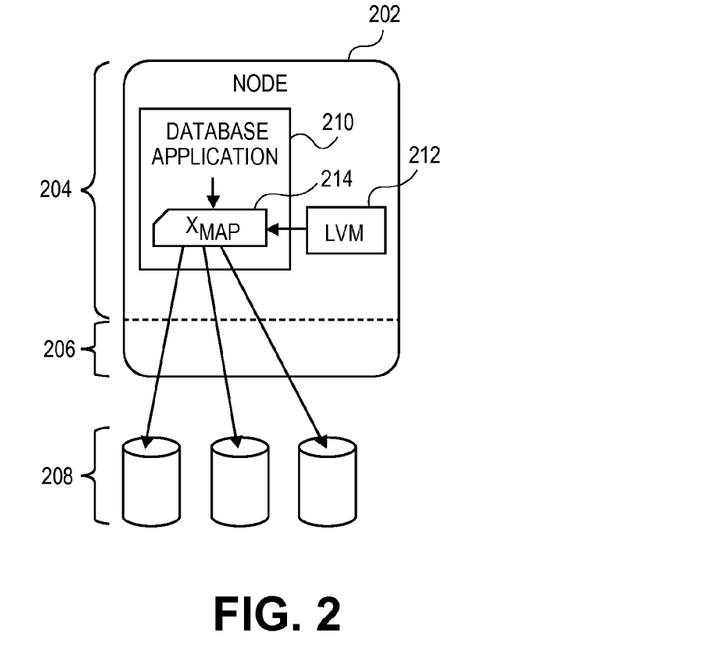
FIG. 2 illustrates a computer node with a logical volume manager (LVM) implemented in the user memory in accordance with an embodiment.

FIG. 2 illustrates computer node 202 with a user-memory-based logical volume manager (DIM) 212 in a configuration that can be used in accordance with one embodiment. LVM 212 resides in user memory 204 as opposed to kernel memory 206. LVM 212 creates and organizes an extent map, Xmap 214, which is stored in a database and used by database application 210. Application 210 uses Xmap 214 to read and write from disks 208.

Figure 3:
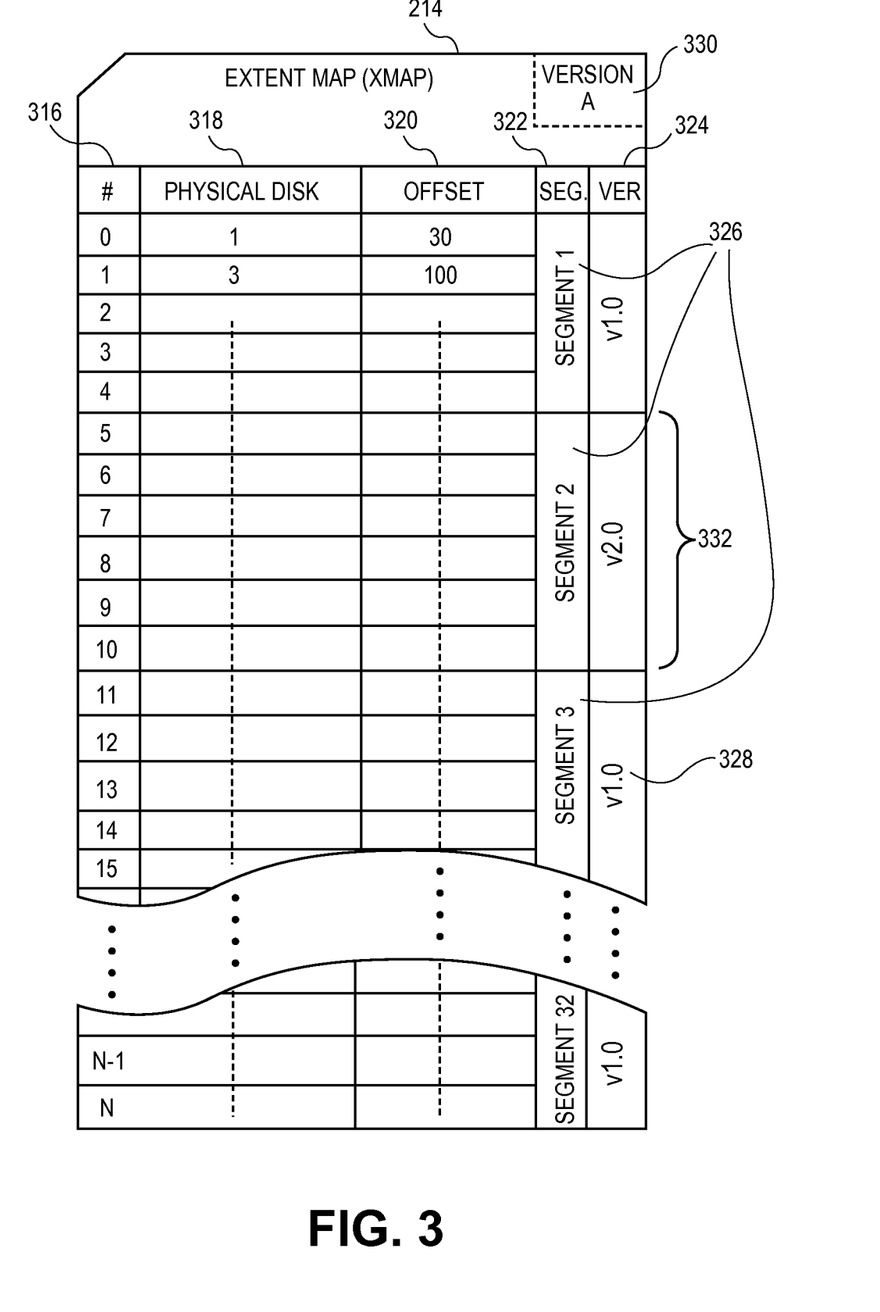
FIG. 3 illustrates an extent map compatible with an embodiment.

FIG. 3 illustrates an example of an Xmap 214, shown as a table. Xmap 214 includes row number column 316, physical disk column 318, and offset column 320. Xmap 214 also includes segment column 322 which associates rows in Xmap 214 to segments 326. Xmap 214 also includes version column 324, which associates each segment 326 to a version number 328. Although Xmap 214 is shown as a flat file, extent maps can use relational database methods. For example, a column in an extent map can hold keys which map each extent to rows in another table, that table holding segment numbers and associated version identifiers. Further, Xmap 214 can take other forms as would be apparent to one of ordinary skill in the art in light of the teachings and suggestions contained herein. Here, Xmap 214 has an overall version indicator 330.

As shown in FIG. 3, segment 332 is new; therefore, its version indicator reflects an incremented version number.

Figure 4A:
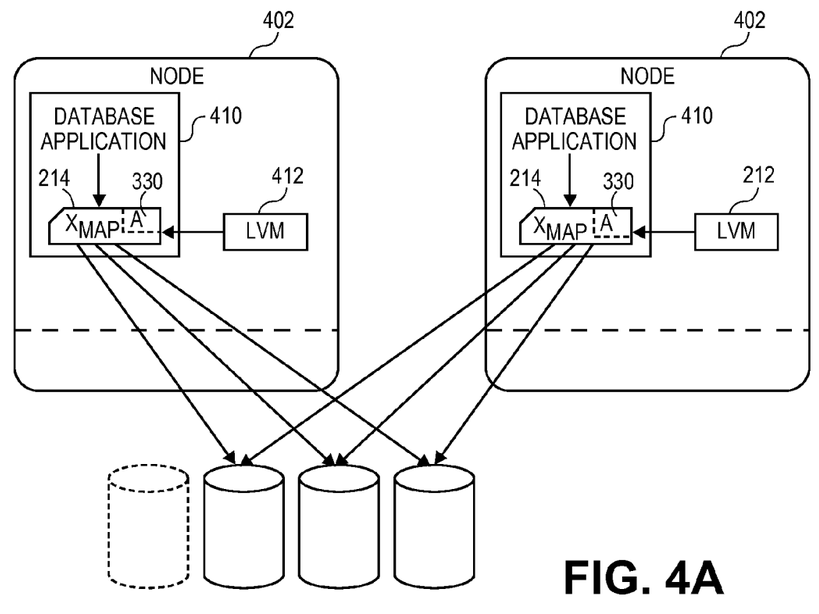
FIG. 4A illustrates a multi-node environment prior to performing a method in accordance with an embodiment.
Figure 4B:
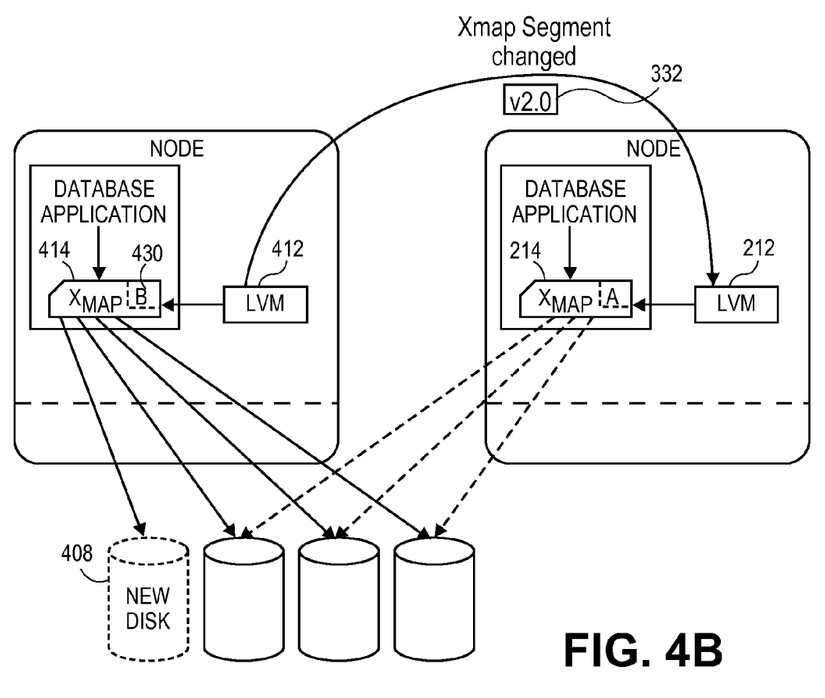
FIG. 4B is the environment of FIG. 4A after an operation in accordance with an embodiment.
Figure 4C:
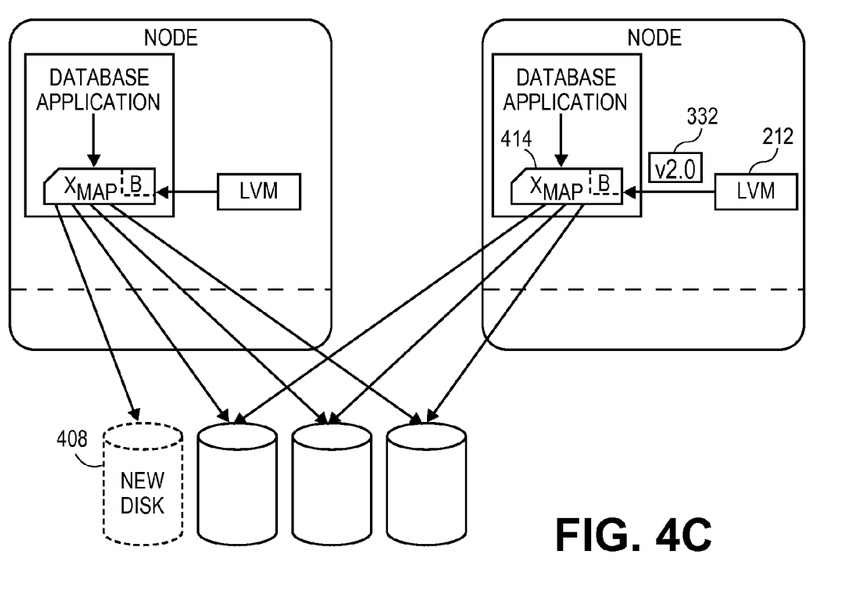
FIG. 4C is the environment of FIG. 4B after an operation in accordance with an embodiment.

FIGS. 4A-4C illustrate a multi-node environment in which operations of an embodiment are performed to update an extent map associated with a logical volume manager (LVM) such that the entire extent map does not need to be replaced by a newer version of the extent map.

FIG. 4A illustrates nodes 402 running database applications 410. Applications 410 reference their respective Xmaps 214, which were initialized in user-memory by their respective LVMs 412 and 212. Each LVM 412 and 212 can be said to be associated with its Xmap 214. In FIG. 4A, Xmaps 214 share the same version indicator 330. Generally, the same version indicators indicate that each segment within the Xmaps are the same.

FIG. 4B illustrates the multi-node environment after disk 408 has been added to the shared disk network. LVM 412 has revised its extent map to a second version of Xmap 414, indicated by version indicator 430. LVM 412 indicates that a segment in its Xmap has changed. LVM 212 determines that segment 332 is different than a corresponding segment in Xmap 214, and suspends all references from Xmap 214 to the disks.

FIG. 4C illustrates the multi-node environment after further operations are completed. LVM 212 updates Xmap 214 (in FIG. 4B) with new segment 332 so that the Xmap effectively becomes Xmap 414, and allows the application to begin accessing the disks, including new disk 408. The update can occur immediately after the second version of extent map 414 is provided, or the update can occur on demand from the application to access I/O. During the above operations, Xmap 214/414 remains substantially in memory such that only new segment 332 needs to be updated and the entire first version of the extent map does not need to be replaced. Only portions of Xmap 214/414 that have changed are updated. Because each Xmap 214/414 is large, this partial updating saves valuable downtime.

FIGS. 5A-5D illustrate a multi-node environment in which operations of an embodiment are performed to hot-swap an LVM such that its entire extent map does not need to be replaced by a newer version of the extent map created by the new LVM.

Figure 5A:
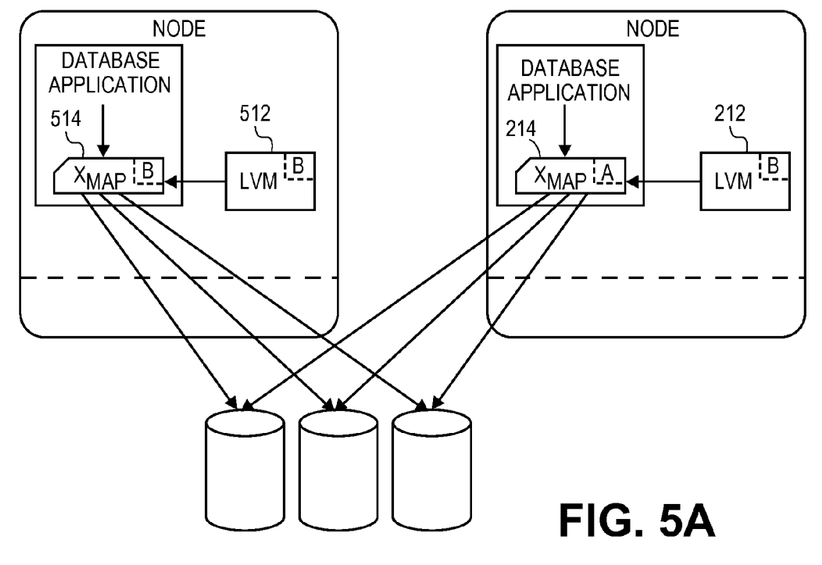
FIG. 5A illustrates a multi-node environment prior to performing a method in accordance with an embodiment.

FIG. 5A illustrates a patched version of the LVM, LVM 512 with corresponding Xmap 514 in one node, while an older version of LVM 212 with corresponding Xmap 214 resides in a second node.

Figure 5B:
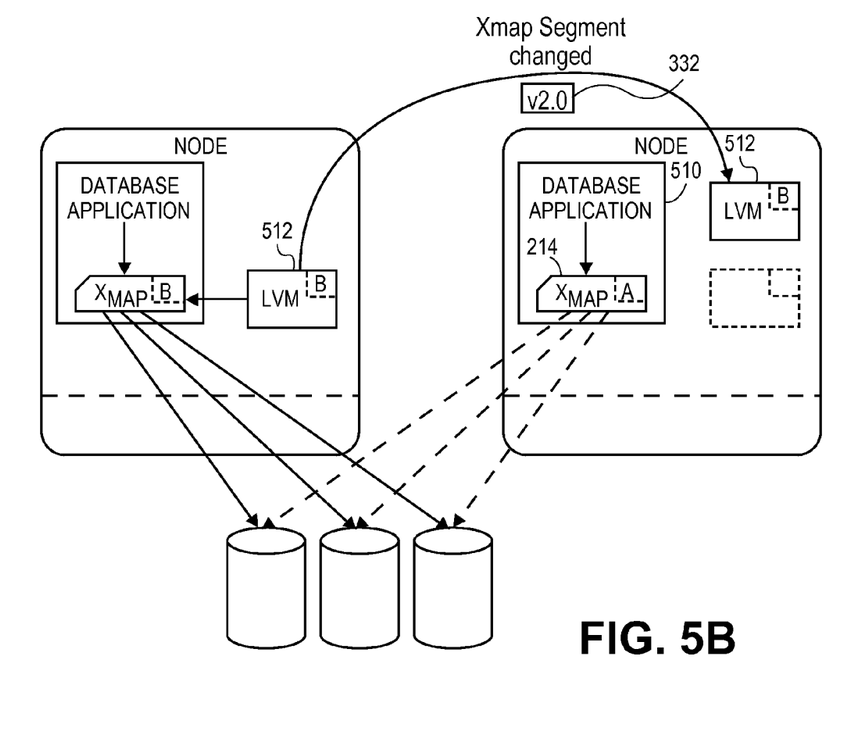
FIG. 5B is the environment of FIG. 5A after an operation in accordance with an embodiment.

FIG. 5B illustrates the results after a few operations. A new LVM patch is provided to upgrade or patch LVM 212 (FIG. 5A) to LVM 512. Normally, Xmaps should not change during an upgrade of an LVM. However, there can be cases in which a new disk or other reconfiguration can change the Xmaps, such as during the time when the unpatched LVM is shut down. Thus, when LVM 212 is shut down or terminated such that database application 510 is quiesced, Xmap 514 can change. When this occurs, existing LVM 512 may send a message, or the newly patched LVM may detect the change on its own. Since it is possible for multiple upgrades to be in progress, it may be more efficient to have each new LVM compare versions with its local database instances. This can be accomplished by reading the new version numbers from the disks. FIG. 5B illustrates the former case in which LVM 512 sends a message. In either case, it is determined whether there is a difference between Xmap 214 and Xmap 514.

Figure 5C:
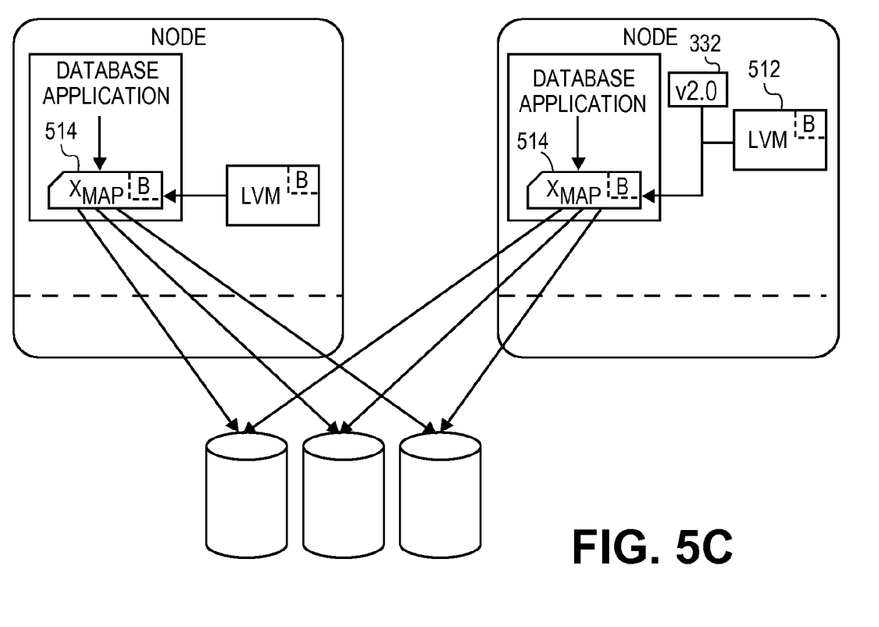
FIG. 5C is the environment of FIG. 5B after an operation in accordance with an embodiment.

FIG. 5C illustrates the final results. LVM 512 has determined that Xmap 514 is different, and has thus updated the Xmap such that the difference, or segment 332, is incorporated into Xmap 214, so that Xmap 214 (FIG. 5B) effectively becomes Xmap 514. The database application is then un-quiesced such that it can access the disks.

In order to preserve data correctness, one must typically ensure that only processes which have appropriate locks are allowed to perform I/O and that complete control over all the processes that are I/O capable is maintained. During online patching of an LVM on a given host, it is preferable that other LVMs on other nodes are guaranteed that applications running on the host that is being patched are well behaved. There are at least two use cases that can be illustrated. The first use case is for a planned shutdown of the LVM, for which all I/Os on the host being patched are completely quiesced. This will generally ensure that there are no outstanding I/Os. Remote clients do not need to be quiesced because for a patch the database is shut down in an orderly fashion. Once the remaining I/Os are purged, the clients can declare that other LVMs do not have to wait for the clients to complete recovery. (This can be achieved by de-registering from cluster synchronization software (CSS)). By de-registering from CSS, the rest of the cluster will likely not be stalled because of I/O capable clients running on a host during the patch process. Purging of the I/Os has been found to work well in situations where events are both observable and controlled. The second use case is for an unplanned shutdown of an LVM, in which the rest of the LVM cluster waits until the I/O capable processes are fenced. 'Fenced' generally means that a process cannot perform any I/O. When the solution of not having to restart the client when the LVM fails is extended (due to software bugs), one must generally ensure that clients do not de-register from CSS until the I/Os are purged. This can ensure that instance recovery will not start in the cluster until all I/O capable processes have noticed that referenced LVM daemons are gone. Once the LVM is restarted, the clients can go through a reinitialization protocol before new I/Os can be submitted. As part of a re-initialization protocol, the clients generally must re-register with CSS using the new incarnation of LVM (i.e., the patched LVM) as their master.

FIGS. 6A-6D illustrate an embodiment implemented in virtual machines. Generally, virtual machine is a software implementation of a computer that executes application software as if the application software were running on the computer. A virtual machine can allow one type of computer to run software compiled for another computer. A virtual machine can be a system virtual machine which runs an entire operating system (OS) or a process virtual machine which runs a single process from an application.

Figure 6A:
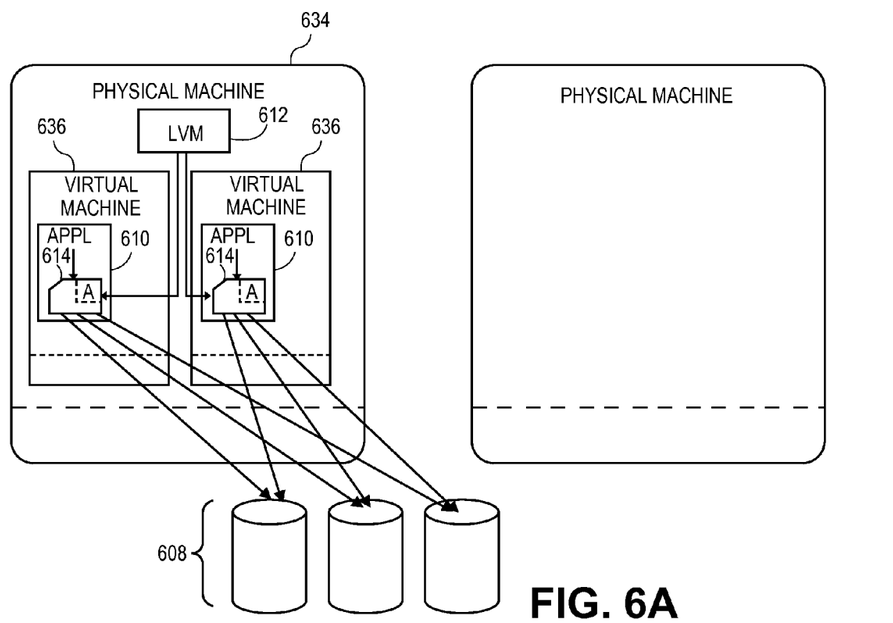
FIG. 6A illustrates applications running within virtual machines prior to performing a method in accordance with an embodiment.

FIG. 6A illustrates physical machine 634 with two virtual machines 636 running applications 610. Applications 610 each reference LVM 612 which runs outside the virtual machines but in the same physical machine 634. LVM 612 maintains extent maps 614 in each application 610, such that each application 610 can access shared disks 608.

Figure 6B:
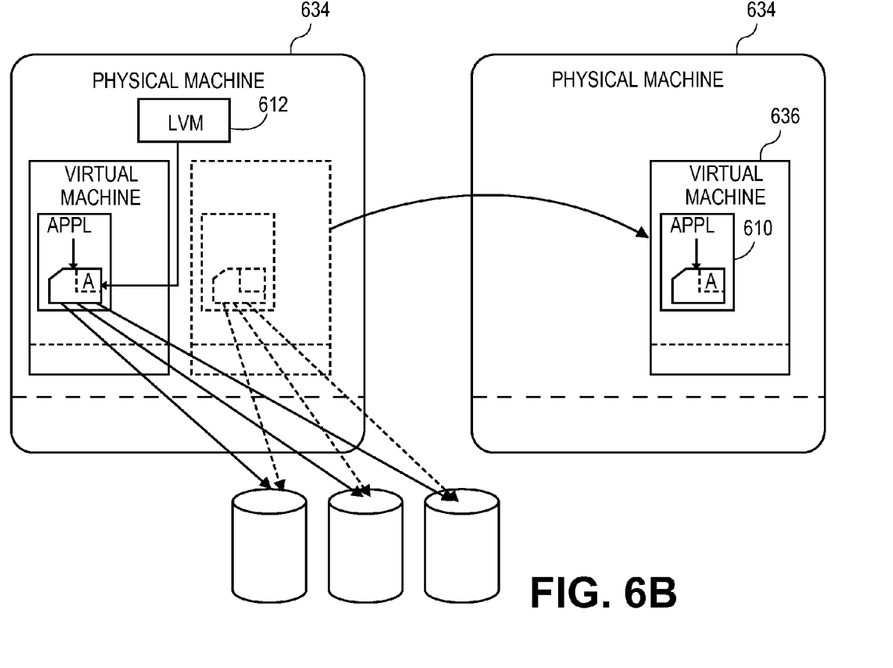
FIG. 6B is the environment of FIG. 6A after an operation in accordance with an embodiment.

With reference to FIG. 6B, one of the virtual machines is migrated to another physical machine 634 while it is still running application 610. Application 610 is quiesced so that the application does not attempt I/O access. The absence of LVM 612 is detected on the second physical machine, either by the application or by the migration manager.

Figure 6C:
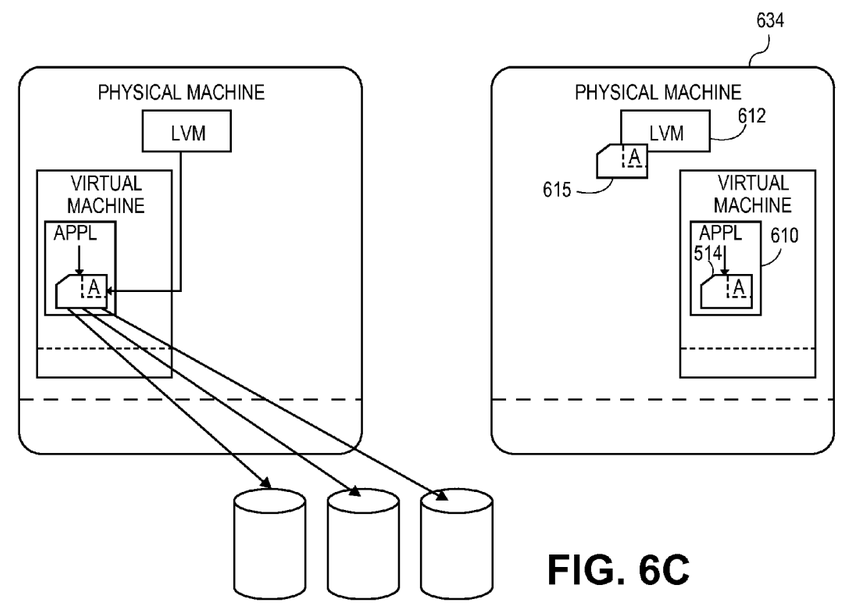
FIG. 6C is the environment of FIG. 6B after an operation in accordance with an embodiment.

With reference to FIG. 6C, another LVM 612 is started up on the second physical machine 634. An extent map is created by the new DIM. The new extent map 615, labeled "A," is the same as Xmap 614 because the partitions are not handled differently for storage shared by the different physical machines.

Figure 6D:
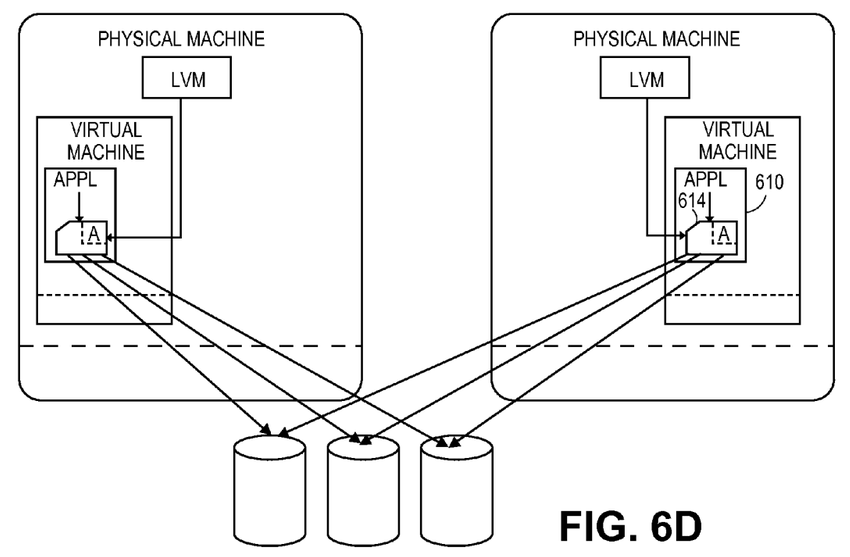
FIG. 6D is the environment of FIG. 6C after an operation in accordance with an embodiment.

With reference to FIG. 6D, no difference between the extent maps is detected. Because there are no differences, entire extent map 614, which was already in memory, does not need to be replaced by created Xmap 615. Application 610 is then un-quiesced.

Figure 7:
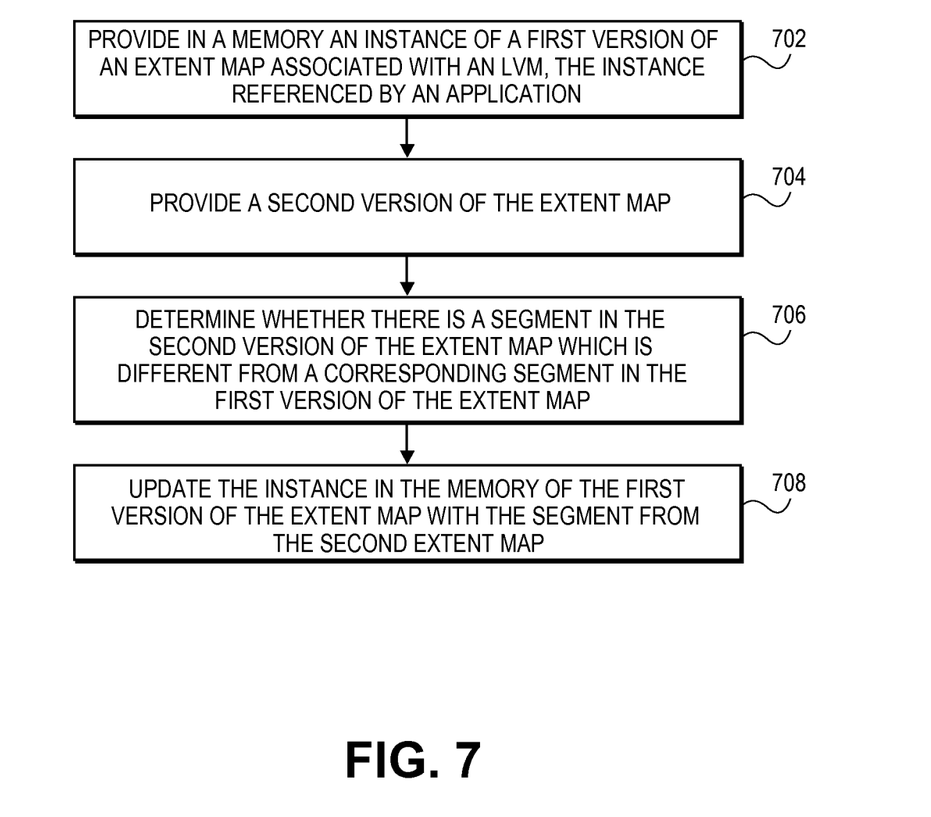
FIG. 7 is a flowchart illustrating an embodiment in accordance with the present invention.

FIG. 7 shows an example flowchart illustrating a process in accordance with one embodiment. In operation 702, an instance of a first version of an extent map associated with an LVM is provided in a memory. The instance is referenced by a software application, such as a database application. Providing a new version of an extent map can be performed by any software, including an install program, the application itself, or another LVM. In operation 704, a second version of the extent map is provided. The extent map may be organized similarly to that shown in FIG. 3. In operation 706, it is determined whether there is a segment in the second version of the extent map which is different from a corresponding segment in the first version of the extent map. This can be accomplished by comparing the instance of the first version of the extent map with an instance of the second version of the extent map. If there is no corresponding segment in the first version of the extent map, then the segment may be considered a 'new' segment, to be added to the extent map. In operation 708, the instance in memory of the first version of the extent map is updated with the segment from the second version of the extent map. By updating only a segment, the entire extent map, which may be dozens or hundreds of megabytes in the buffer cache, does not need to be reloaded.

Figure 8:
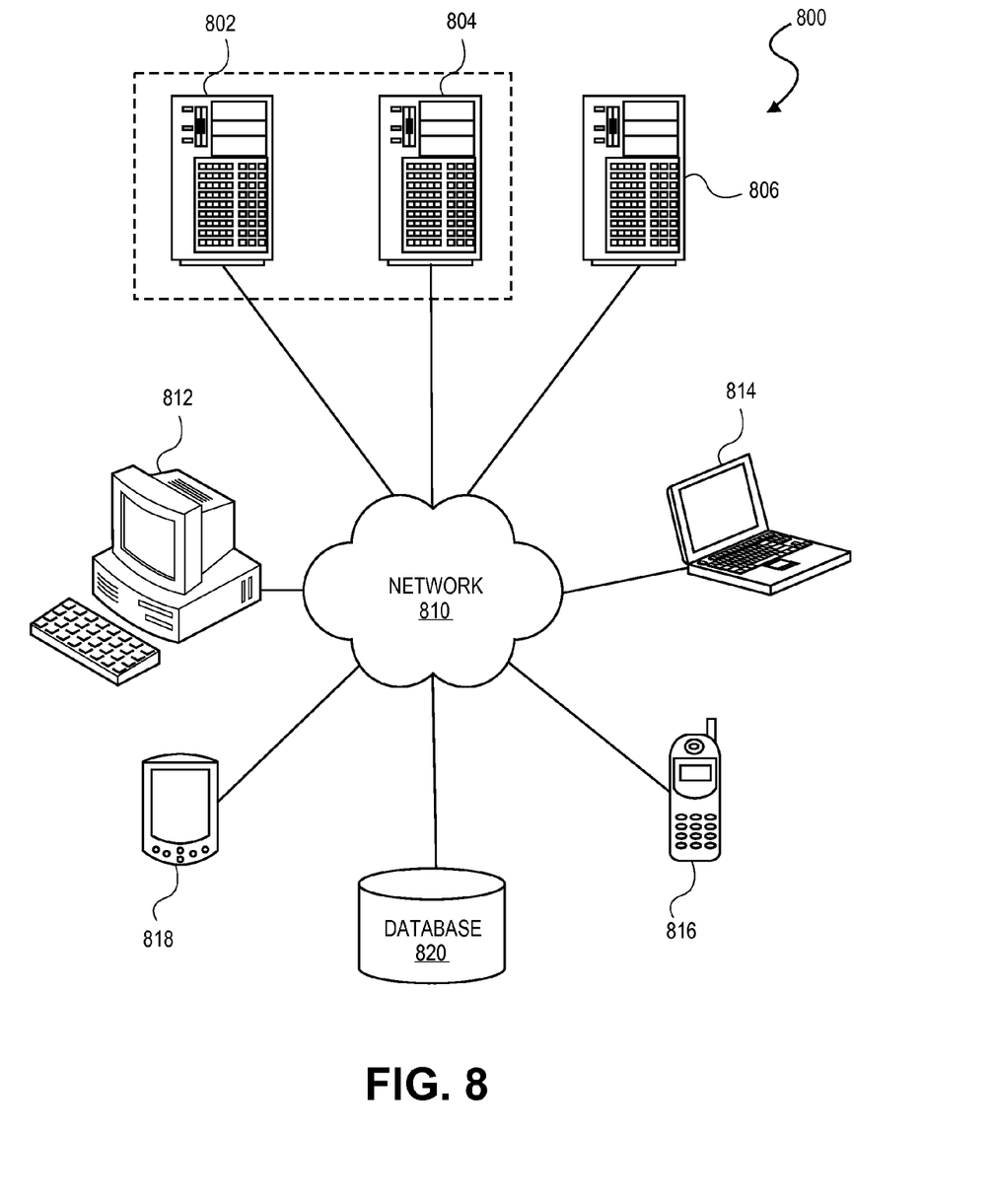
FIG. 8 illustrates components of a computer network that can be used in accordance with one embodiment.

FIG. 8 is a block diagram illustrating components of an exemplary operating environment in which various embodiments of the present invention may be implemented. The system 800 can include one or more user computers, computing devices, or processing devices 812, 814, 816, 818, which can be used to operate a client, such as a dedicated application, web browser, etc. The user computers 812, 814, 816, 818 can be general purpose personal computers (including, merely by way of example, personal computers and/or laptop computers running a standard operating system), cell phones or PDAs (running mobile software and being Internet, SMS, Blackberry, or other communication protocol enabled), and/or workstation computers running any of a variety of commercially-available UNIX or UNIX-like operating systems (including without limitation, the variety of GNU/Linux operating systems). These user computers 812, 814, 816, 818 may also have any of a variety of applications, including one or more development systems, database client and/or server applications, and Web browser applications. Alternatively, the user computers 812, 814, 816, 818 may be any other electronic device, such as a thin-client computer. Internet-enabled gaming system, and/or personal messaging device, capable of communicating via a network (e.g., the network 810 described below) and/or displaying and navigating Web pages or other types of electronic documents. Although the exemplary system 800 is shown with four user computers, any number of user computers may be supported.

In most embodiments, the system 800 includes some type of network 810. The network may can be any type of network familiar to those skilled in the art that can support data communications using any of a variety of commercially-available protocols, including without limitation TCP/IP, SNA, IPX, AppleTalk, and the like. Merely by way of example, the network 810 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, GRPS, GSM, UMTS, EDGE, 2G, 2.5G, 3G, 4G, Wimax, WiFi, CDMA 2000, WCDMA, the Bluetooth protocol known in the art, and/or any other wireless protocol); and/or any combination of these and/or other networks.

The system may also include one or more server computers 802, 804, 806 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 806) may be dedicated to running applications, such as a business application, a Web server, application server, etc. Such servers may be used to process requests from user computers 812, 814, 816, 818. The applications can also include any number of applications for controlling access to resources of the servers 802, 804, 806.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 812, 814, 816, 818. As one example, a server may execute one or more Web applications. The Web application may be implemented as one or more scripts or programs written in any programming language, such as Java®, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM®, and the like, which can process requests from database clients running on a user computer 812, 814, 816, 818.

The system 800 may also include one or more databases 820. The database(s) 820 may reside in a variety of locations. By way of example, a database 820 may reside on a storage medium local to (and/or resident in one or more of the computers 802, 804, 806, 812, 814, 816, 818. Alternatively, it may be remote from any or all of the computers 802, 804, 806, 812, 814, 816, 818, and/or in communication (e.g., via the network 810) with one or more of these. In a particular set of embodiments, the database 820 may reside in a storage-area network ("SAN") familiar to those skilled in the art. Similarly, any necessary files for performing the functions attributed to the computers 802, 804, 806, 812, 814, 816, 818 may be stored locally on the respective computer and/or remotely, as appropriate. In one set of embodiments, the database 820 may be a relational database, such as Oracle 10g, that is adapted to store, update, and retrieve data in response to SQL-formatted commands.

Figure 9:
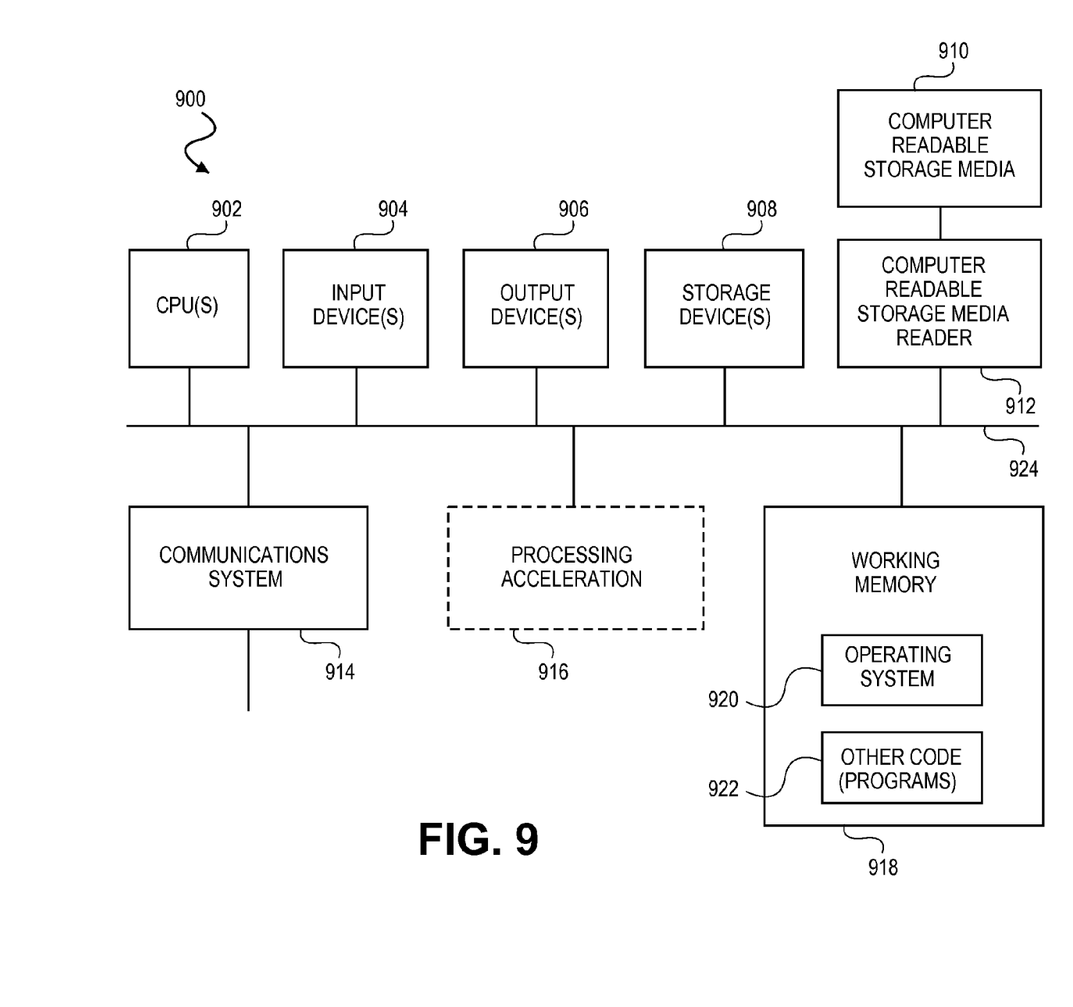
FIG. 9 illustrates components of a computerized device that can be used in accordance with one embodiment.

FIG. 9 illustrates an exemplary computer system 900, in which various embodiments of the present invention may be implemented. The system 900 may be used to implement any of the computer systems described above. The computer system 900 is shown comprising hardware elements that may be electrically coupled via a bus 924. The hardware elements may include one or more central processing units (CPUs) 902, one or more input devices 904 (e.g., a mouse, a keyboard, etc.), and one or more output devices 906 (e.g., a display device, a printer, etc.). The computer system 900 may also include one or more storage devices 908. By way of example, the storage device(s) 908 can include devices such as disk drives, optical storage devices, solid-state storage device such as a random access memory "RAM") and/or a read-only memory ("ROM"), which can be programmable, flash-updateable and/or the like.

The computer system 900 may additionally include a computer-readable storage media reader 912, a communications system 914 (e.g., a modem, a network card (wireless or wired), an infra-red communication device, etc), and working memory 918, which may include RAM and ROM devices as described above. In some embodiments, the computer system 900 may also include a processing acceleration unit 916, which can include a digital signal processor DSP, a special-purpose processor, and/or the like.

The computer-readable storage media reader 912 can further be connected to a computer-readable storage medium 910, together (and, optionally, in combination with storage device(s) 908) comprehensively representing remote, local, fixed, and/or removable storage devices plus storage media for temporarily and/or more permanently containing, storing, transmitting, and retrieving computer-readable information. The communications system 914 may permit data to be exchanged with the network and/or any other computer described above with respect to the system 900.

The computer system 900 may also comprise software elements, shown as being currently located within a working memory 918, including an operating system 920 and/or other code 922, such as an application program (which may be a client application, Web browser, mid-tier application, RDBMS, etc). It should be appreciated that alternate embodiments of a computer system 900 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive.

What is claimed is:

1. A method of updating an extent map, the method comprising:

providing in a memory an instance of a first version of the extent map, wherein the instance is referenced by an application, wherein the extent map include entries;

storing, at each extent map entry, an offset from the beginning of a physical drive which is identified within said each extent map entry;

providing a second version of the extent map;

comparing the first version of the extent map with the second version of the extent map;

in response to the comparing, determining that there is at least one segment in the second version of the extent map that is different from a corresponding at least one segment in the first version of the extent map; and in response to the determining, updating the first version of the extent map with the at least one segment from the second extent map, wherein the extent map further comprises an overall version indicator and a plurality of segments, wherein the determining comprises comparing a version indicator of at least one of the segments of the first version of the extent map with a version indicator of at least one of the segments of the second extent map.

2. The method of claim 1, wherein a logical volume manager (LVM) resides in a first node of a multi-node environment in which disks are shared, further comprising receiving the second version of the extent map from a second LVM in a second node of the multi-node environment.

3. The method of claim 2, further comprising updating the instance in a memory of the first version of the extent map at a time in which a new connection is established between the first and second nodes.

4. The method of claim 1, wherein the first and second version indicators are version numbers.

5. The method of claim 1, wherein the updating the instance in memory of the first version of the extent map occurs in response to a request for one of reading or writing to persistent storage from the application.

6. The method of claim 1, further comprising saving segments of the first version of the extent map before the updating.

7. The method of claim 2, wherein the PIM further resides in user memory.

8. The method of claim 1, wherein the application is a database application and the extent map resides in a database of the database application.

9. The method of claim 8, further comprising temporarily quiescing the database application.

10. The method of claim 2, wherein the application runs in a virtual machine.

11. The method of claim 10, wherein the LVM resides outside the virtual machine.

12. A non-transitory computer-readable medium having sets of instructions stored thereon which, when executed by a computer, cause the computer to:

provide in a memory an instance of a first version of the extent map, wherein the instance is referenced by an application, wherein the extent map include entries;

store, at each extent map entry, an offset from the beginning of a physical drive which is identified within said each extent map entry;

provide a second version of the extent map;

compare the first version of the extent map with the second version of the extent map;

in response to the comparing, determine that there is at least one segment in the second version of the extent map that is different from a corresponding at least one segment in the first version of the extent map; and in response to the determining, update the first version of the extent map with the at least one segment from the second extent map, wherein the extent map further comprises an overall version indicator and a plurality of segments, wherein the determining comprises comparing a version indicator of at least one of the segments of the first version of the extent map with a version indicator of at least one of the segments of the second extent map.

13. The non-transitory computer-readable medium of claim 12, wherein a logical volume manager (LVM) resides in a first node of a multi-node environment in which disks are shared, further comprising receiving the second version of the extent map from a second LVM in a second node of the multi-node environment.

14. The non-transitory computer-readable medium of claim 13, wherein the sets of instructions when further executed by the computer, cause the computer to update the instance in a memory of the first version of the extent map at a time in which a new connection is established between the first and second nodes.

15. The non-transitory computer-readable medium of claim 12, wherein the first and second version indicators are version numbers.

16. The non-transitory computer-readable medium of claim 12, wherein the updating the instance in memory of the first version of the extent map occurs in response to a request for one of reading or writing to persistent storage from the application.

17. The non-transitory computer-readable medium of claim 12, wherein the sets of instructions when further executed by the computer, cause the computer to save segments of the first version of the extent map before the updating.

18. A system for updating an extent map, the system comprising:
   a memory device; and
   a processor in communication with the memory device, wherein the memory device has sets of instructions store thereon which, when executed by the processor, cause the processor to:
      provide in a memory an instance of first version of the extent map, wherein the instance is referenced by an application, wherein the extent map include entries;
      store, at each extent map entry, an offset from the beginning of a physical drive which is identified within said each extent map entry;
      provide a second version of the extent map;
      compare the first version of the extent map with the second version of the extent map;
      in response to the comparing, determine that there is at least one segment in the second version of the extent map that is different from a corresponding at least one segment in the first version of the extent map; and
      in response to the determining, update the first version of the extent map with the at least one segment from the second extent map, wherein the extent map further comprises an overall version indicator and a plurality of segments, wherein the determining comprises comparing a version indicator of at least one of the segments of the first version of the extent map with a version indicator of at least one of the segments of the second extent map.

19. The system of claim 18, wherein the application is a database application and the extent map resides in a database of the database application.

20. The system of claim 19, wherein the sets of instructions further cause the processor to temporarily quiesce the database application.

* * * * *

UNITED STATES PATENT AND TRADEMARK OFFICE
CERTIFICATE OF CORRECTION

PATENT NO. : 8,701,110 B2
APPLICATION NO. : 13/709024
DATED : April 15, 2014
INVENTOR(S) : Friedman et al.

It is certified that error appears in the above-identified patent and that said Letters Patent is hereby corrected as shown below:

In the Specification

In column 1, line 60, delete "anode" and insert -- a node --, therefor.

In column 7, line 37, after "Internet," insert -- e-mail, --.

In the Claims

In column 10, line 41, in Claim 7, delete "PIM" and insert -- LVM --, therefor.

In column 12, line 6, in Claim 18, after "instance of" insert -- a --.

Signed and Sealed this
Twenty-sixth Day of August, 2014

Michelle K. Lee
*Deputy Director of the United States Patent and Trademark Office*